United States Patent
Peng et al.

(10) Patent No.: US 11,568,526 B2
(45) Date of Patent: Jan. 31, 2023

(54) DUAL SENSOR IMAGING SYSTEM AND IMAGING METHOD THEREOF

(71) Applicant: Altek Semiconductor Corp., Hsinchu (TW)

(72) Inventors: Shih-Yuan Peng, Hsinchu (TW);
Shu-Chun Cheng, Hsinchu (TW);
Hsu-Lien Huang, Taipei (TW);
Yun-Chin Li, Hsinchu (TW);
Kuo-Ming Lai, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 143 days.

(21) Appl. No.: 17/216,639

(22) Filed: Mar. 29, 2021

(65) Prior Publication Data

US 2021/0217153 A1    Jul. 15, 2021

Related U.S. Application Data

(60) Provisional application No. 63/074,477, filed on Sep. 4, 2020.

(30) Foreign Application Priority Data

Dec. 23, 2020   (TW) ................. 109145632

(51) Int. Cl.
*G06K 9/00*      (2022.01)
*G06T 5/50*      (2006.01)
(Continued)

(52) U.S. Cl.
CPC ............. *G06T 5/50* (2013.01); *G06T 1/0007* (2013.01); *H04N 5/33* (2013.01); *H04N 5/357* (2013.01);
(Continued)

(58) Field of Classification Search
CPC ................ G06T 5/50; G06T 1/0007; G06T 2207/10024; G06T 2207/10048;
(Continued)

(56) References Cited

U.S. PATENT DOCUMENTS

2008/0024608 A1    1/2008  Hahn et al.
2011/0228096 A1    9/2011  Friel et al.
(Continued)

FOREIGN PATENT DOCUMENTS

CN      102461156       5/2012
CN      107431760       12/2017
(Continued)

OTHER PUBLICATIONS

Ulug, M. E., and Claire L. McCullough. "Feature and data-level fusion of infrared and visual images." Sensor Fusion: Architectures, Algorithms, and Applications III 3719 (1999): 312-318. (Year: 1999).*

(Continued)

*Primary Examiner* — Andrew M Moyer
(74) *Attorney, Agent, or Firm* — JCIPRNET

(57) ABSTRACT

A dual sensor imaging system and an imaging method thereof are provided. The method includes: identifying an imaging scene; controlling a color sensor and an IR sensor to respectively capture color images and IR images by adopting capturing conditions suitable for the imaging scene; calculating a signal-to-noise ratio (SNR) difference between each color image and the IR images, and a luminance mean value of each color image; selecting the color image and IR image captured under capturing conditions of having the SNR difference less than an SNR threshold and the luminance mean value greater than a luminance threshold to execute a feature domain transformation to extract partial details of the imaging scene; and fusing the selected (Continued)

color image and IR image to adjust the partial details of the color image according to a guidance of the partial details of the IR image to obtain a scene image with full details.

16 Claims, 6 Drawing Sheets

(51) Int. Cl.
  *H04N 5/33* (2006.01)
  *H04N 5/357* (2011.01)
  *G06T 1/00* (2006.01)
(52) U.S. Cl.
  CPC .............. *G06T 2207/10024* (2013.01); *G06T 2207/10048* (2013.01); *G06T 2207/20221* (2013.01)
(58) Field of Classification Search
  CPC . G06T 2207/20221; G06T 2207/20208; G06T 3/4015; H04N 5/33; H04N 5/357; H04N 9/04553
  See application file for complete search history.

(56) References Cited

U.S. PATENT DOCUMENTS

| | | |
|---|---|---|
| 2011/0298898 A1 | 12/2011 | Jung et al. |
| 2012/0189293 A1 | 7/2012 | Cao et al. |
| 2013/0342703 A1 | 12/2013 | Lin |
| 2015/0245062 A1 | 8/2015 | Shimizu et al. |
| 2015/0334283 A1 | 11/2015 | Vranceanu |
| 2017/0094141 A1 | 3/2017 | Hicks |
| 2017/0318222 A1 | 11/2017 | Mantzel et al. |
| 2017/0330053 A1 | 11/2017 | Park et al. |
| 2018/0007240 A1 | 1/2018 | Rivard et al. |
| 2018/0137431 A1 | 5/2018 | Goldfarb et al. |
| 2018/0139431 A1 | 5/2018 | Simek et al. |
| 2018/0278832 A1* | 9/2018 | Shabtay ............... H04N 5/2628 |
| 2019/0197667 A1 | 6/2019 | Paluri |
| 2020/0045247 A1 | 2/2020 | Okamoto et al. |
| 2020/0126246 A1 | 4/2020 | Mantzel et al. |
| 2020/0134849 A1 | 4/2020 | Blasco Claret et al. |
| 2020/0166646 A1 | 5/2020 | Van Der Sijde et al. |
| 2020/0193584 A1 | 6/2020 | Park et al. |
| 2020/0294214 A1* | 9/2020 | Numata ................... H04N 5/33 |
| 2021/0044763 A1 | 2/2021 | Sun et al. |
| 2021/0201476 A1 | 7/2021 | Prasad et al. |

FOREIGN PATENT DOCUMENTS

| | | |
|---|---|---|
| CN | 107845083 | 3/2018 |
| CN | 107846537 | 3/2018 |
| CN | 110462686 | 11/2019 |
| CN | 110706178 | 1/2020 |
| CN | 111527743 | 8/2020 |
| CN | 111540003 | 8/2020 |
| TW | 200849978 | 12/2008 |
| TW | 201228382 | 7/2012 |
| TW | M458748 | 8/2013 |
| TW | 201721269 | 6/2017 |
| TW | 201931847 | 8/2019 |
| WO | 2020055619 | 3/2020 |

OTHER PUBLICATIONS

Estrera, Joseph P. "Localized signal-to-noise ratio of man and vehicle size targets." Infrared Technology and Applications XXXV 7298 (2009): 72983M. (Year: 2009).*
"Office Action of Taiwan Related Application, application No. 109146764", dated Dec. 28, 2021, p. 1-p. 8.
"Office Action of Taiwan Related Application, application No. 109146922", dated Oct. 28, 2021, p. 1-p. 14.
"Office Action of Taiwan Counterpart Application, application No. 109145632", dated Nov. 10, 2021, p. 1-p. 8.
"Office Action of Taiwan Related Application, application No. 109146831", dated Nov. 30, 2021, p. 1-p. 21.
"Office Action of Taiwan Related Application, Application No. 109145614", dated Mar. 3, 2022, p. 1-p. 17.
"Office Action of Related U.S. Appl. No. 17/214,946", dated Apr. 13, 2022, p. 1-p. 36.
"Office Action of Related U.S. Appl. No. 17/191,701", dated Apr. 28, 2022, p. 1-p. 21.
"Office Action of Taiwan Related Application, Application No. 109146831", dated Nov. 11, 2022, p. 1-p. 6.

* cited by examiner

DUAL SENSOR IMAGING SYSTEM AND IMAGING METHOD THEREOF

CROSS-REFERENCE TO RELATED APPLICATION

This application claims the priority benefit of U.S. Provisional Application No. 63/074,477, filed on Sep. 4, 2020 and Taiwan application serial no. 109145632, filed on Dec. 23, 2020. The entirety of each of the above-mentioned patent applications is hereby incorporated by reference herein and made a part of this specification.

BACKGROUND

Technical Field

The disclosure relates to an imaging system and an imaging method, and in particular to a dual sensor imaging system and an imaging method thereof.

Description of Related Art

The exposure conditions of a camera (including aperture, shutter, and photosensitivity) may affect the quality of a captured image. Therefore, many cameras automatically adjust the exposure conditions during the image capturing process to obtain clear and bright images. However, in high-contrast scenes such as low light sources or backlights, the result of adjusting the exposure conditions of the camera may result in excessive noise or overexposure in some areas, such that the image quality of all areas cannot be taken care of.

In this regard, the current technology adopts a new image sensor architecture, which utilizes the characteristic of high light sensitivity of the infrared ray (IR) sensor, and interleaves IR pixels among the color pixels of the image sensor to assist in luminance detection. For example, FIG. 1 is a schematic diagram of conventional image capture using an image sensor. Please refer to FIG. 1, in addition to red (R), green (G), blue (B), and other color pixels, a conventional image sensor 10 is also interleaved with infrared (I) pixels. In this way, the image sensor 10 can combine color information 12 captured by the R, G, and B color pixels with luminance information 14 captured by the I pixel to obtain an image 16 with moderate color and luminance.

However, under the architecture of the single image sensor, the exposure conditions of each pixel in the image sensor are the same. Therefore, only the exposure conditions more suitable for color pixels or I pixels can be selected to capture images. It is still impossible to effectively use the characteristics of the two types of pixels to improve the image quality of the captured image.

SUMMARY

The disclosure provides a dual sensor imaging system and an imaging method thereof, which use independently configured color sensor and infrared ray (IR) sensor to capture multiple images under different capturing conditions, and select the color and IR images with the appropriate exposure and noise within the allowable range to be fused into a result image, so as to increase the details of the captured image and improve the image quality.

The dual sensor imaging system of the disclosure includes at least one color sensor, at least one IR sensor, a storage device, and a processor coupled to the color sensor, the IR sensor, and the storage device. The processor is configured to load and execute a computer program stored in the storage device to: identify an imaging scene of the dual sensor imaging system; control the color sensor and the IR sensor to respectively capture multiple color images and multiple IR images by adopting multiple capturing conditions suitable for the imaging scene, and the capturing conditions include different combinations of exposure time and photosensitivity; calculate a signal-to-noise ratio (SNR) difference between each color image and the IR images, and a luminance mean value of each color image; select the color image and the IR image captured under the capturing conditions of having the SNR difference less than an SNR threshold and having the luminance mean value greater than a luminance threshold to execute a feature domain transformation, so as to extract partial details of the imaging scene; and fuse the selected color image and IR image to adjust partial details of the color image according to a guidance of partial details of the IR image, so as to obtain a scene image with full details of the imaging scene.

An imaging method of a dual sensor imaging system of the disclosure is suitable for the dual sensor imaging system including at least one color sensor, at least one IR sensor, a storage device, and a processor. The method includes the following steps. An imaging scene of the dual sensor imaging system is identified. The color sensor and the IR sensor are controlled to respectively capture multiple color images and multiple IR images by adopting multiple capturing conditions suitable for the imaging scene. The capturing conditions include different combinations of exposure time and photosensitivity. A signal-to-noise ratio (SNR) difference between each color image and the IR images, and a luminance mean value of each color image are calculated. The color image and the IR image captured under the capturing conditions of having the SNR difference less than a SNR threshold and having the luminance mean value greater than a luminance threshold are selected to execute a feature domain transformation, so as to extract partial details of the imaging scene. The selected color image and IR image are fused to adjust partial details of the color image according to a guidance of partial details of the IR image, so as to obtain a scene image with full details of the imaging scene.

Based on the above, the dual sensor imaging system and the imaging method thereof of the disclosure use independently configured color sensor and IR sensor to capture multiple images suitable for different capturing conditions of the current imaging scene, and select the color image and the IR image with appropriate exposure and noise within the allowable range to be fused into the result image according to the SNR and luminance differences of the captured images, so as to increase the details of the captured image and improve the image quality.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
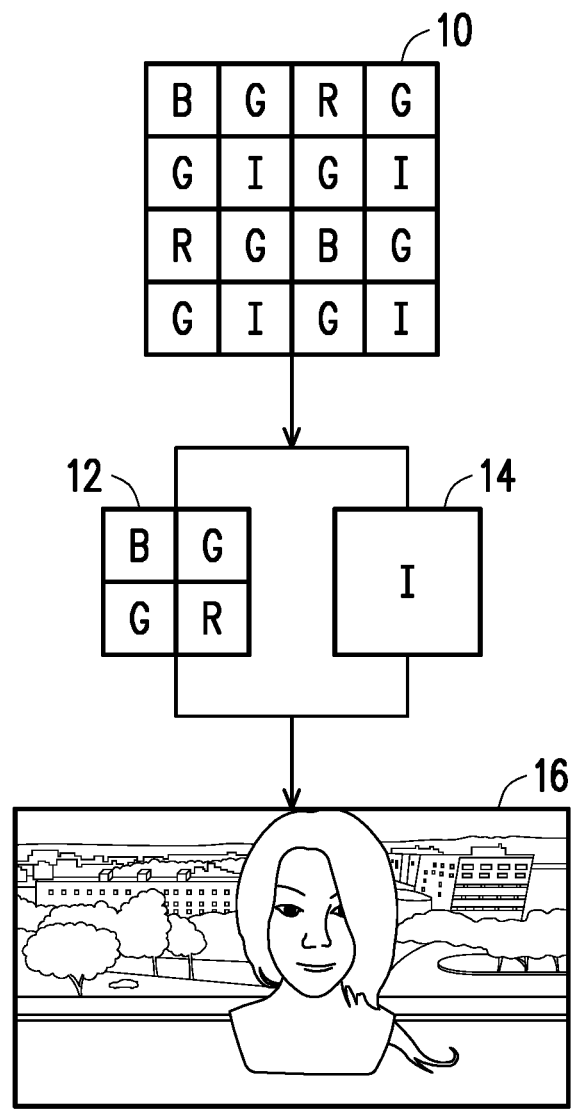
FIG. 1 is a schematic diagram of conventional image capture using an image sensor.
Figure 2:
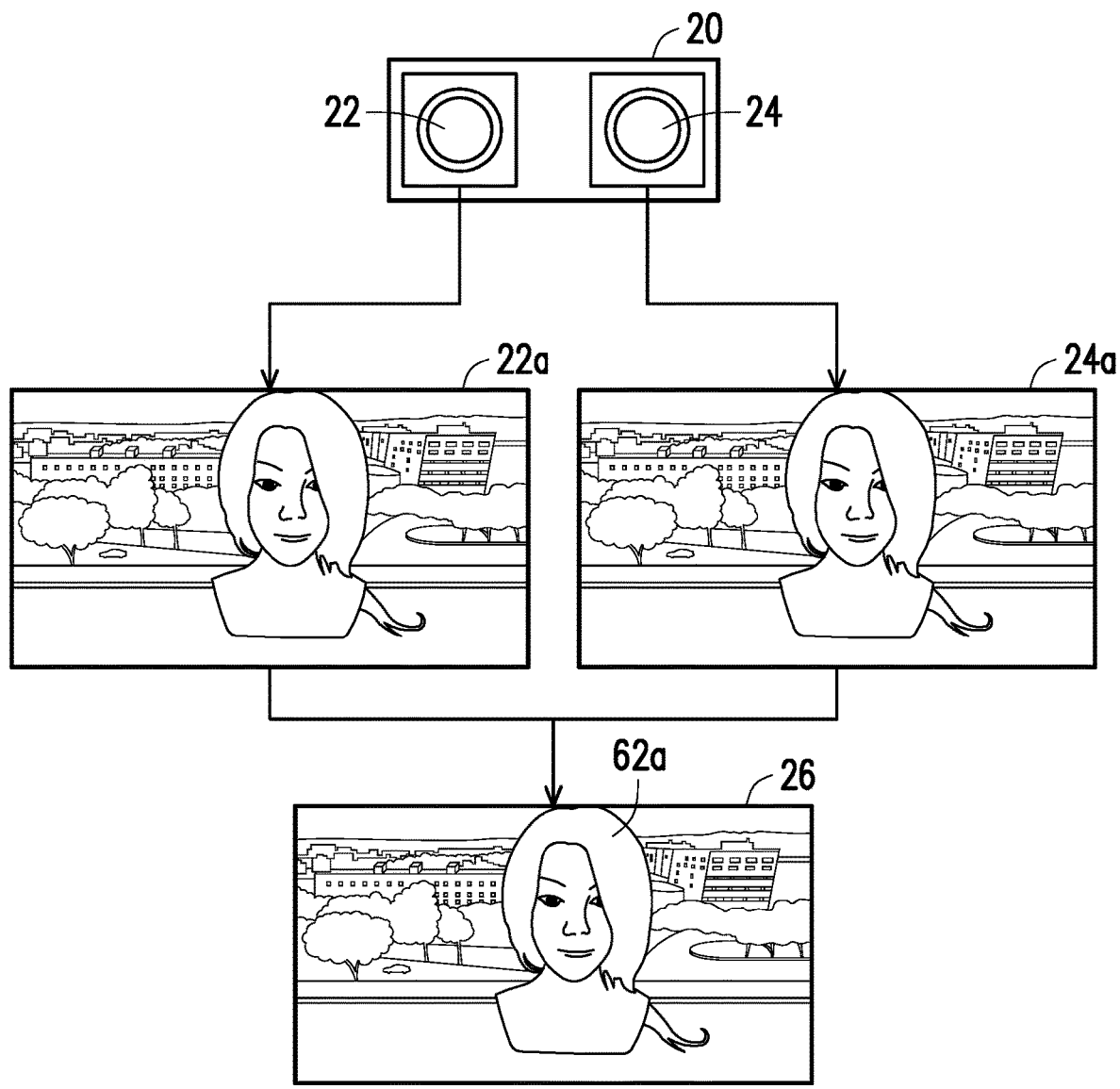
FIG. 2 is a schematic diagram of image capture using an image sensor according to an embodiment of the disclosure.

FIG. 2 is a schematic diagram of image capture using an image sensor according to an embodiment of the disclosure. Referring to FIG. 2, an image sensor 20 of an embodiment of the disclosure adopts a dual sensor architecture of independently configured color sensor 22 and infrared ray (IR) sensor 24. Using the characteristics of each of the color sensor 22 and the IR sensor 24, multiple images are respectively captured by adopting multiple exposure conditions suitable for the current imaging scene, and a color image 22a and an IR image 24a with appropriate exposure conditions are selected. Through image fusion, the IR image 24a is configured to complement the texture details lacking in the color image 22a, so as to obtain a scene image 26 with good color and texture details.

Figure 3:
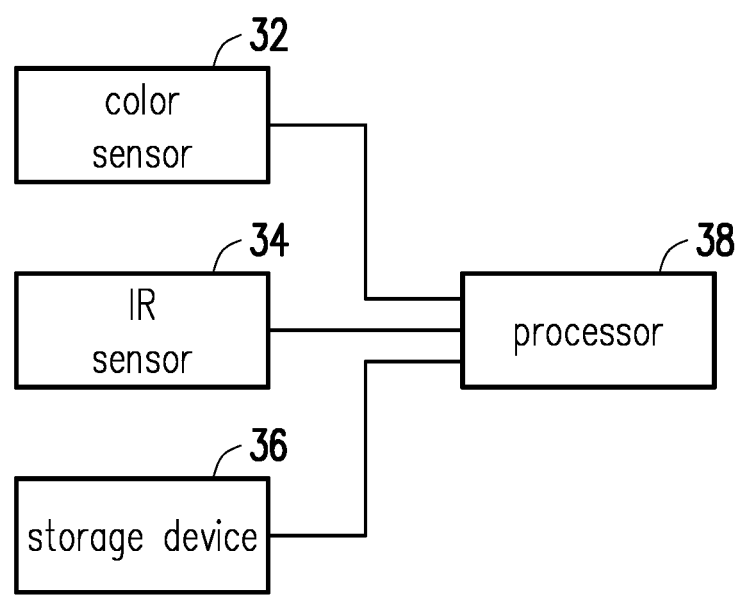
FIG. 3 is a block diagram of a dual sensor imaging system according to an embodiment of the disclosure.

FIG. 3 is a block diagram of a dual sensor imaging system according to an embodiment of the disclosure. Referring to FIG. 3, the dual sensor imaging system 30 of the embodiment is configured in electronic device such as mobile phones, tablets, laptops, navigation devices, dashcams, digital cameras, digital video cameras, etc., and is configured to provide an imaging function. The dual sensor imaging system 30 includes at least one color sensor 32, at least one IR sensor 34, a storage device 36, and a processor 38, and the functions thereof are as follows.

The color sensor 32, for example, includes a charge coupled device (CCD), a complementary metal-oxide semiconductor (CMOS) element, or other types of photosensitive elements, and may sense light intensity to generate images of the imaging scene. The color sensor 32 is, for example, an RGB image sensor which includes red (R), green (G), and blue (B) color pixels, and is configured to capture color information of red light, green light, blue light, etc. in the imaging scene, and fuse the color information to generate a color image of the imaging scene.

The IR sensor 34, for example, includes a CCD, a CMOS element, or other types of photosensitive elements, and can sense an infrared ray by adjusting the wavelength sensing range of the photosensitive element. The IR sensor 34, for example, uses the above photosensitive elements as pixels to capture infrared information in the imaging scene, and fuse the infrared information to generate an IR image of the imaging scene.

The storage device 36 is, for example, any type of fixed or removable random access memory (RAM), read-only memory (ROM), flash memory, hard disk, similar elements, or a combination of the above elements, and is configured to store a computer program executed by the processor 38. In some embodiments, the storage device 36 may, for example, also store the color image captured by the color sensor 32 and the IR image captured by the IR sensor 34.

The processor 38 is, for example, a central processing unit (CPU), other programmable general-purpose or specific-purpose microprocessors, microcontrollers, digital signal processors (DSPs), programmable controllers, application specific integrated circuits (ASICs), programmable logic devices (PLDs), other similar devices, or a combination of these devices, and the disclosure is not limited thereto. In the embodiment, the processor 38 may load a computer program from the storage device 36 to execute the imaging method of the dual sensor imaging system of the embodiment of the disclosure.

Based on extreme imaging scenes such as late night (or low light source) and bright sunlight or backlight, many parts of the color image will lose details due to underexposure or overexposure. These parts (that is, defect areas to be described later) need to be filled appropriately to better improve the image quality. In this regard, the embodiment of the disclosure adaptively adjusts the exposure time and/or the photosensitivity (ISO) of the color sensor to ensure that the captured image at least reveals some details of the defect area. For the adjustment of the exposure time and/or photosensitivity, the embodiment of the disclosure also uses a pre-defined signal-to-noise ratio (SNR) threshold and luminance threshold as appropriate limits, so as to achieve a balance between image detail, luminance, and noise.

Figure 4:
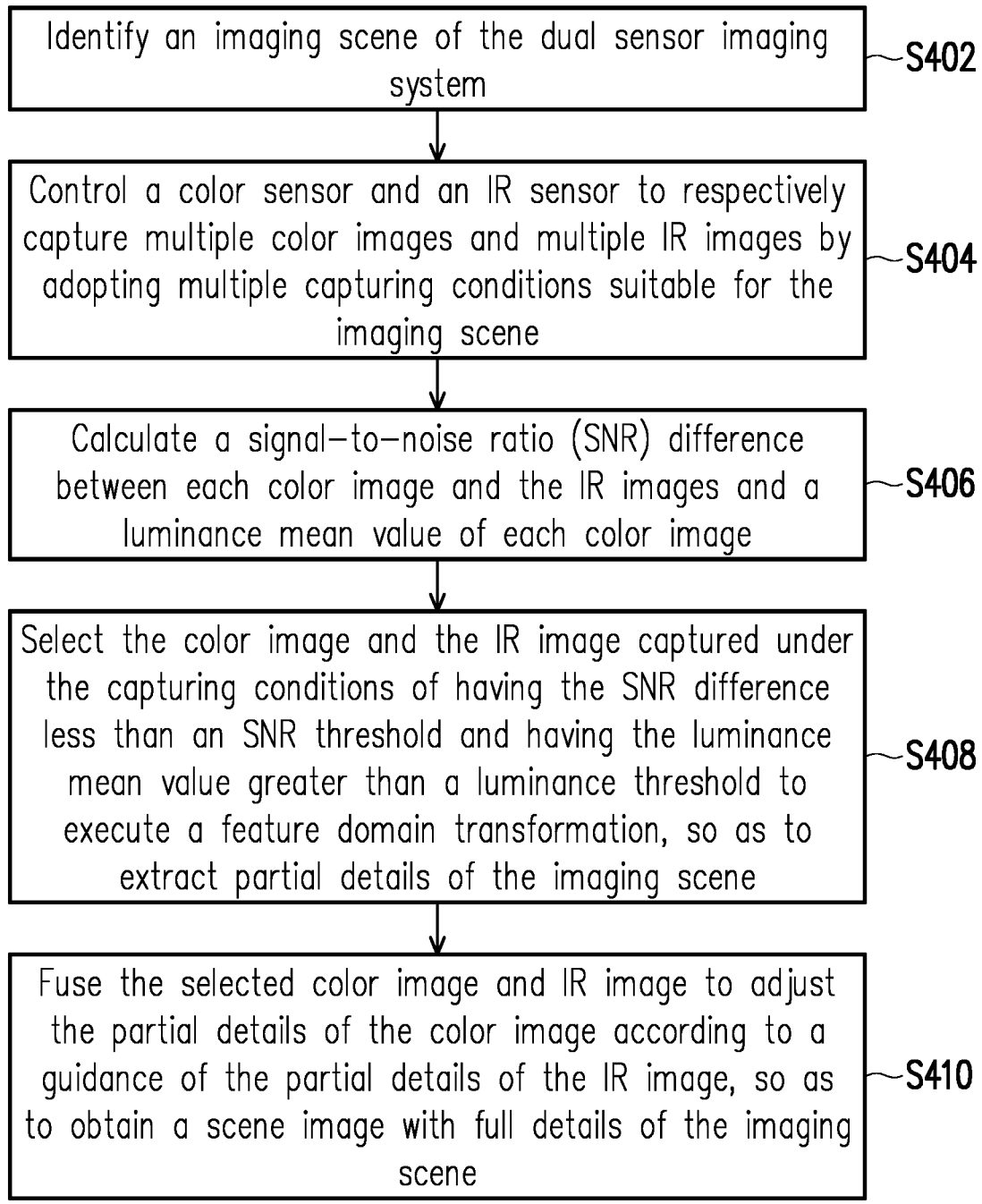
FIG. 4 is a flow chart of an imaging method of the dual sensor imaging system according to an embodiment of the disclosure.

FIG. 4 is a flow chart of an imaging method of the dual sensor imaging system according to an embodiment of the disclosure. Referring to FIG. 3 and FIG. 4 at the same time, the method of this embodiment is suitable for the dual sensor imaging system 30, and the detailed steps of the imaging method of this embodiment are described below in conjunction with the elements of the dual sensor imaging system 30.

In Step S402, the processor 38 identifies an imaging scene of the dual sensor imaging system. In some embodiment, the processor 38, for example, controls at least one of the color sensor 32 and the IR sensor 34 to capture at least one standard image of the imaging scene by adopting a standard exposure condition, and uses these standard images to identify the imaging scene. The standard exposure conditions, for example, include the aperture, shutter, photosensitivity, and other parameters determined by the existing metering technology. The processor 38 identifies the imaging scene, including the location of the imaging scene (indoor or outdoor), light source (high light source or low light source), contrast (high contrast or low contrast), type of an imaging subject (object or portrait), state (dynamic or static), etc., according to the strength or distribution of image parameters such as hue, value, chroma, and white balance of the image captured under this exposure condition. In other embodiment, the processor 38 may also adopt positioning to identify the imaging scene or directly receive a user operation to set the imaging scene, and is not limited thereto.

In Step S404, the processor 38 controls the color sensor 32 and the IR sensor 34 to respectively capture multiple color images and multiple IR images by adopting multiple capturing conditions suitable for the identified imaging scene. In some embodiment, the processor 38, for example, determines whether the captured image includes a bright area or a dark area lacking texture details to identify whether the imaging scene includes a defect area lacking texture details. When the defect area is identified, the processor 38, for example, takes the exposure time and photosensitivity in the standard exposure condition as the benchmark, and aims to increase the texture details of the defect area to determine the exposure time and photosensitivity of each capturing condition. In the case where the imaging scene includes the bright area and the dark area lacking texture details, the corresponding implementations will be respectively described in detail in the following embodiments.

In Step S406, the processor 38 calculates a SNR difference between each color image and the IR images and a luminance mean value of each color image to be used to compare with a preset SNR threshold and luminance threshold. The SNR threshold and the luminance threshold are, for example, limiting conditions for the quality of the captured image to meet the requirements by capturing images under different capturing conditions for various scenes in advance and analyzing the image parameters such as the SNR and luminance of the images. The limiting conditions may provide the processor 38 as a basis for selecting the color image and the IR image.

In Step S408, the processor 38 selects the color image and the IR image captured having the SNR difference less than the SNR threshold and having the luminance mean value greater than the luminance threshold to execute a feature domain transformation, so as to extract partial details of the imaging scene. The processor 38, for example, selects the color image with more details of the imaging scene from multiple color images having the SNR difference less than the SNR threshold and having the luminance mean value greater than the luminance threshold as the image for subsequent fusion with the IR image. Besides, the processor 38 may, for example, execute the feature domain transformation such as a color space transformation or s gradient transformation on the selected color image and IR image, thereby extracting features in the image with more details of the imaging scene (such as color details, texture details, or edge details) as a basis for subsequent image fusion.

In Step S410, the processor 38 fuses the selected color image and IR image to adjust partial details of the color image according to a guidance of partial details of the IR image, so as to obtain a scene image with full details of the imaging scene. In some embodiment, when the processor 38 fuses the color image and the IR image, the processor 38, for example, uses the guidance of the texture details and/or edge details of the IR image to enhance the color details in the color image. Finally, the scene image with full color, texture, and edge details of the imaging scene is obtained.

It should be noted that, in some embodiment, an IR projector may be additionally configured in the dual sensor imaging system 30. The processor 38 may control the infrared sensor 32 to capture the IR image, and at the same time control the IR projector to project an infrared ray to the imaging scene, thereby increasing the texture details in the IR image captured by the IR sensor 32.

Besides, in some embodiment, the texture details of some defect areas in the color image may not be enhanced or complemented by IR images due to specific factors. For example, the parallax between the color sensor 32 and the IR sensor 34 will cause the IR sensor 34 to be obscured. In this case, the processor 38 may, for example, control the color sensor 32 to capture multiple color images by adopting multiple exposure times longer or shorter than the exposure time of the selected color image and execute a high dynamic range (HDR) process to generate a scene image with texture details of the defect area.

In some embodiment, the processor 38, for example, uses an exposure time shorter than the exposure time and an exposure time longer than the exposure time according to the exposure time of the selected color image, controls the color sensor 32 to respectively capture a color image with the shorter exposure time and a color image with the longer exposure time, and combines the color image captured with the original exposure time to implement the HDR process. That is, areas with better color and texture details are selected from the three color images to complement areas lacking details in other color images, so as to obtain an HDR image with good details in bright parts and dark parts as the finally output scene image.

In some embodiment, the processor 38, for example, executes a noise reduction (NR) process, such as 2D spatial denoise, for the HDR image to reduce noise in the HDR image, so as to improve the image quality of the finally output image.

In a late night or low light source scene, even if a longer exposure time and/or higher photosensitivity are adopted to capture an image to increase the color and texture details of the captured image, noise of the image will increase correspondingly. In this regard, in order to ensure that the quality of the captured image is within an acceptable range, the embodiment of the disclosure adaptively sets multiple capturing conditions that increase the exposure time and/or photosensitivity to capture the image. The images with appropriate exposure and noise within the allowable range are selected for fusion by calculating the differences in the SNR and the luminance value between the captured images, so as to obtain a scene image with image details and quality.

Figure 5:
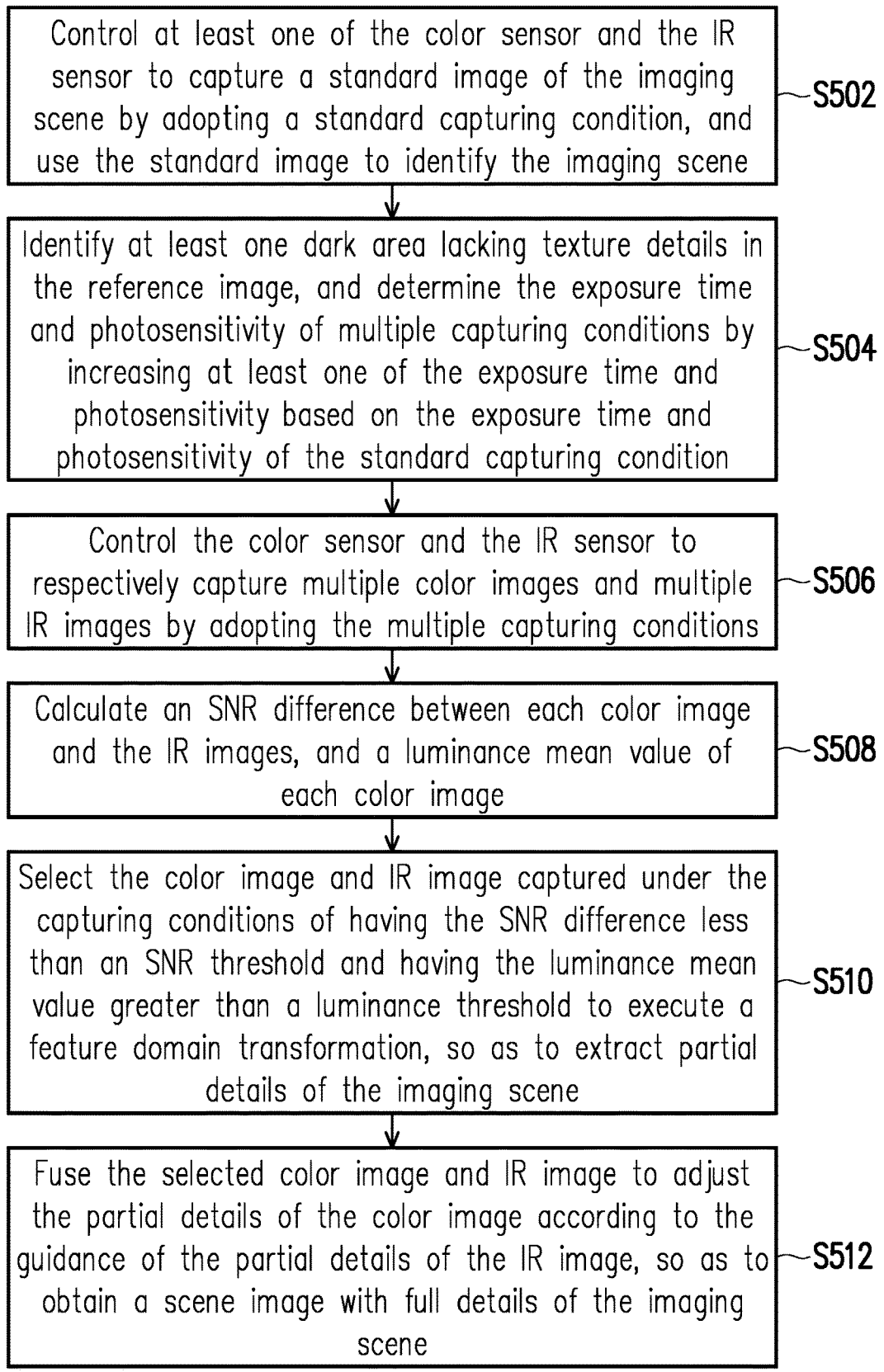
FIG. 5 is a flow chart of an imaging method of the dual sensor imaging system according to an embodiment of the disclosure.

FIG. 5 is a flow chart of an imaging method of the dual sensor imaging system according to an embodiment of the disclosure. Referring to FIG. 3 and FIG. 5 at the same time, the method of this embodiment illustrates the dual sensor imaging system 30 in the late night or low light source scene, and the detailed steps of the imaging method of this embodiment are described below in conjunction with the elements of the dual sensor imaging system 30.

In Step S502, the processor 38 controls at least one of the color sensor 32 and the IR sensor 34 to capture standard image of the imaging scene by adopting a standard capturing condition, and uses the standard images to identify the imaging scene. The definition of the standard exposure condition and the identification of the imaging scene are as described in the previous embodiment, and will not be repeated here.

In Step S504, the processor 38 identifies at least one dark area lacking texture details in the standard image, and determines the exposure time and photosensitivity of multiple capturing conditions by increasing at least one of the exposure time and photosensitivity based on the exposure time and photosensitivity of the standard capturing condition. The increased exposure time is, for example, any value between 0.1 and 3 exposure value (EV), and the increased sensitivity is, for example, any value between 50 and 1000, and is not limited thereto.

In Step S506, the processor 38 controls the color sensor 32 and the IR sensor 34 to respectively capture multiple color images and multiple IR images by adopting the multiple determined capturing conditions.

In Step S508, the processor 38 calculates an SNR difference between each color image and the IR images, and the luminance mean value of each color image to be compared with a preset SNR threshold and luminance threshold.

In Step S510, the processor 38 selects the color image having the SNR difference less than the SNR threshold and having the luminance mean value greater than the luminance threshold and the corresponding IR image t to execute the feature domain transformation, so as to extract partial details of the imaging scene.

In Step S512, the processor 38 fuses the selected color image and IR image to adjust partial details of the color image according to the guidance of partial details of the IR image, so as to obtain a scene image with full details of the imaging scene. The implementation of the above Steps S506 to S512 is the same or similar to Steps S404 to S410 of the previous embodiment, so the details are not repeated here.

By the above method, even in the late night or low light source scene, the dual sensor imaging system 30 can capture and select the color image and the IR image with appropriate exposure and noise within the allowable range for fusion, so as to maximize the details of the captured image and improve the image quality.

In a backlit scene or a high luminance scene, the background is brighter than the capturing subject, or the overall is brighter, such that the color image captured by the color sensor will lose color and texture details due to overexposure. In order for the captured image to include more details, the embodiment of the disclosure adaptively sets multiple capturing conditions that reduce the exposure time and/or photosensitivity to capture the image. The images with appropriate exposure and noise within the allowable range are selected for fusion by calculating the differences in the SNR and the luminance value between the captured images, so as to obtain a scene image with image details and quality.

Figure 6:
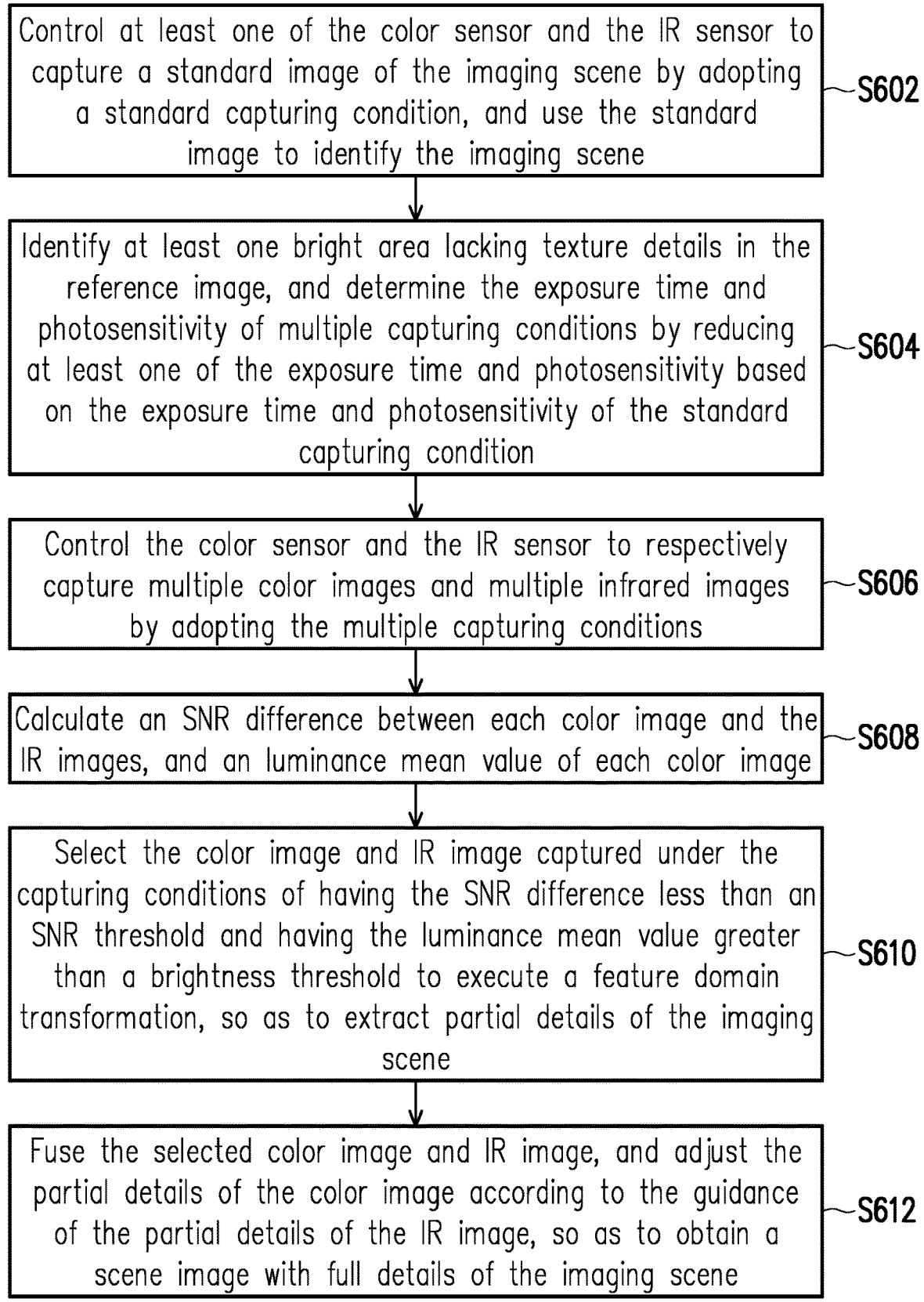
FIG. 6 is a flow chart of an imaging method of the dual sensor imaging system according to an embodiment of the disclosure.

FIG. 6 is a flow chart of an imaging method of the dual sensor imaging system according to an embodiment of the disclosure. Referring to FIG. 3 and FIG. 6, the method of this embodiment illustrates the dual sensor imaging system 30 in the backlit or high luminance scene, and the detailed steps of the imaging method of this embodiment are described below in conjunction with the elements of the dual sensor imaging system 30.

In Step S602, the processor 38 controls at least one of the color sensor 32 and the IR sensor 34 to capture at least one standard image of the imaging scene by adopting a standard capturing condition, and uses the standard images to identify the imaging scene. The definition of the standard exposure condition and the identification of the imaging scene are as described in the previous embodiment, and will not be repeated here.

In Step S604, the processor 38 identifies at least one bright area lacking texture details in the standard image, and determines the exposure time and photosensitivity of multiple capturing conditions by reducing at least one of the exposure time and photosensitivity based on the exposure time and photosensitivity of the standard capturing condition. The reduced exposure time is, for example, any value between 0.1 and 3 EV, and the reduced photosensitivity is, for example, any value between 50 and 1000, and is not limited thereto.

In Step S606, the processor 38 controls the color sensor 32 and the IR sensor 34 to respectively capture multiple color images and multiple infrared images by adopting the multiple determined capturing conditions.

In Step S608, the processor 38 calculates the SNR difference between each color image and the IR images, and the luminance mean value of each color image to be compared with the preset SNR threshold and luminance threshold.

In Step S610, the processor 38 selects the color image having the SNR difference less than the SNR threshold and having the luminance mean value greater than the luminance threshold and the corresponding IR image to execute the feature domain transformation, so as to extract partial details of the imaging scene.

In Step S612, the processor 38 fuses the selected color image and IR image to adjust partial details of the color image according to the guidance of partial details of the IR image, so as to obtain a scene image with full details of the imaging scene. The implementation of the above Steps S606 to S612 is the same or similar to Steps S404 to S410 of the previous embodiment, so the details are not repeated here.

By the above method, even in the backlit or high luminance scene, the dual sensor imaging system 30 can capture and select the color image and the IR image with appropriate exposure and noise within the allowable range for fusion, so as to maximize the details of the captured image and improve the image quality.

In summary, the dual sensor imaging system and the imaging method thereof of the disclosure uses independently configured color sensor and IR sensor to respectively capture multiple images by adopting multiple capturing conditions suitable for the current imaging scene, and select the images with appropriate exposure and noise within the allowable range for fusion according to the SNR and luminance differences of the captured image. Using the guidance of the texture and edge details of the IR image to appropriately adjust the color details of the color image, the dual sensor imaging system of the disclosure can finally obtain the scene image with full details of the imaging scene.

What is claimed is:

1. A dual sensor imaging system, comprising:
   at least one color sensor;
   at least one infrared ray (IR) sensor;
   a storage device, storing a computer program; and
   a processer, coupled to the at least one color sensor, the at least one IR sensor, and the storage device, and configured to load and execute the computer program to:
   identify an imaging scene of the dual sensor imaging system;
   control the at least one color sensor and the at least one IR sensor to respectively capture a plurality of color images and a plurality of IR images by adopting a plurality of capturing conditions suitable for the imaging scene;
   calculate a signal-to-noise ratio (SNR) difference between each of the color images and the IR images and a luminance mean value of each of the color images;
   select the color image having the SNR difference less than an SNR threshold and having the luminance mean value greater than a luminance threshold and the corresponding IR image to execute a feature domain transformation, so as to extract partial details of the imaging scene; and
   fuse the selected color image and IR image to adjust the partial details of the color image according to a guidance of the partial details of the IR image, so as to obtain a scene image with full details of the imaging scene.

2. The dual sensor imaging system according to claim 1, wherein the processor:
   controls at least one of the at least one color sensor and the at least one IR sensor to capture at least one standard image of the imaging scene by adopting a standard capturing condition, and uses the at least one standard image to identify the imaging scene.

3. The dual sensor imaging system according to claim 1, wherein the processor determines an exposure time and a photosensitivity of each of the capturing conditions with an aim to increase texture details of a defect area when the identified imaging scene comprises at least one defect area lacking the texture details.

4. The dual sensor imaging system according to claim 3, wherein the processor determines the exposure time and the photosensitivity of each of the capturing conditions by increasing at least one of the exposure time and the photosensitivity based on the exposure time and the photosensitivity of the standard capturing condition when the identified imaging scene comprises at least one dark area lacking the texture details.

5. The dual sensor imaging system according to claim 3, wherein the processor determines the exposure time and the photosensitivity of each of the capturing conditions by reducing at least one of the exposure time and the photosensitivity based on the exposure time and the photosensitivity of the standard capturing condition when the identified imaging scene comprises at least one bright area lacking the texture details.

6. The dual sensor imaging system according to claim 3, further comprising an IR projector, wherein the processor:
controls the IR projector to project an infrared ray to increase the texture details in the IR image captured by the at least one IR sensor.

7. The dual sensor imaging system according to claim 3, wherein the processor further:
determines whether each of the IR images comprises the texture details of the defect area; and
controls the at least one color sensor to capture a plurality of color images by adopting a plurality of exposure times longer or shorter than the exposure time of the selected color image and executes a high dynamic range (HDR) process when none of the IR images comprises the texture details, so as to generate the scene image with the texture details of the defect area.

8. The dual sensor imaging system according to claim 1, wherein the feature domain transformation comprises a color space transformation or a gradient transformation.

9. An imaging method of a dual sensor imaging system, wherein the dual sensor system comprises at least one color sensor, at least one IR sensor, and a processor, the imaging method comprising:
identifying an imaging scene of the dual sensor imaging system;
controlling the at least one color sensor and the at least one IR sensor to respectively capture a plurality of color images and a plurality of IR images by adopting a plurality of capturing conditions suitable for the imaging scene;
calculating an SNR difference between each of the color images and the IR images and a luminance mean value of each of the color images;
selecting the color image and the IR image captured under the capturing conditions of having the SNR difference less than an SNR threshold and having the luminance mean value greater than a luminance threshold to execute a feature domain transformation, so as to extract partial details of the imaging scene; and
fusing the selected color image and IR image to adjust the partial details of the color image according to a guidance of the partial details of the IR image, so as to obtain a scene image with full details of the imaging scene.

10. The imaging method according to claim 9, wherein the step of identifying the imaging scene of the dual sensor imaging system comprises:
controlling at least one of the at least one color sensor and the at least one IR sensor to capture at least one standard image of the imaging scene by adopting a standard capturing condition, and using the at least one standard image to identify the imaging scene.

11. The imaging method according to claim 9, wherein after the step of identifying the imaging scene of the dual sensor imaging system, the imaging method further comprises:
determining an exposure time and a photosensitivity of each of the capturing conditions with an aim to increase texture details of a defect area when the identified imaging scene comprises at least one defect area lacking the texture details.

12. The imaging method according to claim 11, wherein the step of determining the exposure time and the photosensitivity of each of the capturing conditions with the aim to increase the texture details of the defect area comprises:
determining the exposure time and the photosensitivity of each of the capturing conditions by increasing at least one of the exposure time and the photosensitivity based on the exposure time and the photosensitivity of the standard capturing condition when the identified imaging scene comprises at least one dark area lacking the texture details.

13. The imaging method according to claim 11, wherein the step of determining the exposure time and the photosensitivity of each of the capturing conditions with the aim to increase the texture details of the defect area comprises:
determining the exposure time and the photosensitivity of each of the capturing conditions by reducing at least one of the exposure time and the photosensitivity based on the exposure time and the photosensitivity of the standard capturing condition when the identified imaging scene comprises at least one bright area lacking the texture details.

14. The imaging method according to claim 11, wherein the dual sensor imaging system further comprises an IR projector, the imaging method further comprising:
controlling the IR projector to project an infrared ray to increase the texture details in the IR image captured by the at least one IR sensor.

15. The imaging method according to claim 11, further comprising:
determining whether each of the IR images comprises the texture details of the defect area; and
controlling the at least one color sensor to capture a plurality of color images by adopting a plurality of exposure times longer or shorter than the exposure time of the selected color image and executing an HDR process when none of the IR images comprises the texture details, so as to generate the scene image with the texture details of the defect area.

16. The imaging method according to claim 9, wherein the feature domain transformation comprises a color space transformation or a gradient transformation.

* * * * *